Sept. 21, 1943.   J. CASTELLANO   2,329,876
PIPE COUPLING
Filed April 3, 1941

INVENTOR.
James Castellano
BY
ATTORNEY

UNITED STATES PATENT OFFICE 2,329,876

PIPE COUPLING

James Castellano, Brooklyn, N. Y.

Application April 3, 1941, Serial No. 386,617

1 Claim. (Cl. 285—166)

My invention relates to pipe couplings and refers particularly to pipe couplings adapted for the coupling of a pipe without threads and a pipe with threads.

The lead pipe from the waste water exit of hand basins and similar devices has a smooth unthreaded exterior face, said pipe being usually vertically dependent from said basin.

It is necessary that this pipe be connected to a second pipe, which usually carries a trap of considerable weight, and that these two pipes be strongly attached to each other, as the weight of the lower pipe will have a tendency to pull away from the upper smooth faced pipe.

It is evident, therefore, that full dependence can not be placed in the effectiveness of a gasket connection between the pipes as a connecting means, as a very considerable pressure would have to be maintained between a gasket carried by a coupling and the smooth face of the pipe, and as the resiliency of a gasket will decrease in time, the weight of the lower pipe would gradually pull it away from the upper pipe, with the resulting liability of injury to the trap and the other pipe connections.

The device of my invention overcomes the above-mentioned, and other, objectionable features of couplings suggested for the accomplishment of the described purpose, as will be evident from a consideration of my specification and accompanying drawing, in which similar parts are designated by similar numerals.

Figure 1:
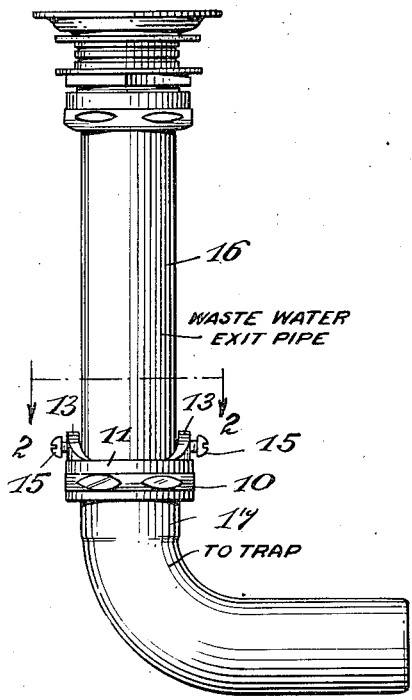
Figure 1 is a side view of one form of a device of my invention, illustrating one means of applying as a coupling for an exterior smooth faced pipe and an exteriorly threaded pipe.

The particular form of the pipe coupling of my invention shown in the accompanying drawing comprises an annular collar comprising the lower internally threaded element 10, and the inwardly extended element 11 forming the annular shoulder 12. The upper element 11 of the collar has a plurality of upwardly extended ears 13, 13, each having an internally threaded opening 14 therein. A set screw 15 is adapted to be threaded within the opening 14 of each ear 13.

Figure 2:
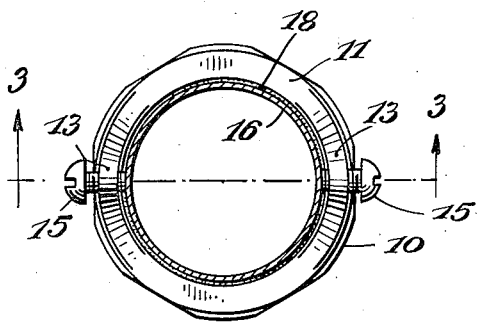
Figure 2 is a section through the line 2—2 of Figure 1.
Figure 4:
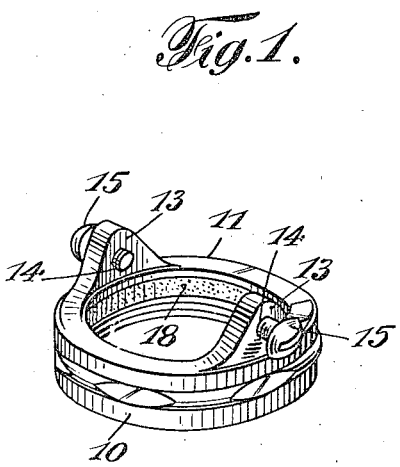
Figure 4 is a perspective view of the form of my device shown in Figures 1, 2 and 3.
Figure 3:
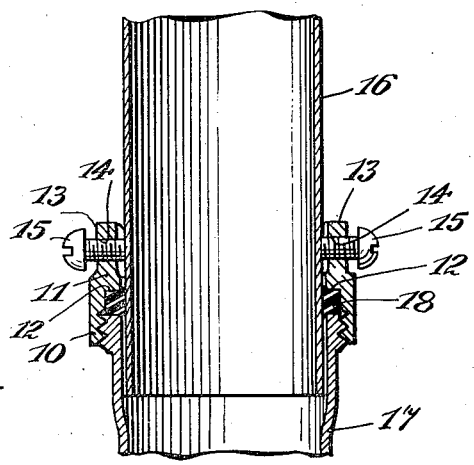
Figure 3 is a section through the line 3—3 of Figure 2.

One means of employing the coupling of my invention is shown in Figures 1, 2 and 3.

The upper end of the pipe 16, having a smooth exterior face, is coupled by any convenient means to the exit opening of a hand-basin or other desired receptacle. The lower end of the pipe 16 is inserted into the upper end of the pipe 17, the upper portion of which is externally threaded. The pipe 17 may be connected to a trap, or to any other suitable device, or may be directly connected to a waste pipe.

In coupling the pipes 16 and 17, the pipe 16 is inserted within the collar 10—11 and is then slipped into the pipe 17. The collar 10—11, carrying the annular resilient gasket 18, is then moved downwardly and is threaded with the pipe 17, this threading being continued until the gasket 18 is forcibly seated between the pipe 16 and the coupling. The set screws 15, 15 are then threaded inwardly until they are abutted forcibly upon the outer face of the pipe 16.

It will thus be seen that if the gasket 18, through use or age will not abut upon the coupling and the pipe 16 to retain the pipe 16 within the pipe 17, due to a downward pull of the latter, due to the weight of a trap or otherwise, the set screws 15, 15 will hold the pipes in fixed position, and hence the fixed attachment of the pipes 16 and 17 is not solely dependent upon the resiliency, or abutment, of the gasket 18.

The separation of the pipes 16 and 17 is simple, consisting in outwardly threading the set screws 15, 15, revolving the coupling to unthread it with the pipe 17, moving the coupling upwardly upon the pipe 16, and disengaging the pipes 16 and 17.

It will thus be seen that my invention presents a coupling by which a smooth faced pipe and a threaded pipe may be fixedly attached to each other, said attachment not depending solely upon the resiliency, or contact of an employed gasket.

I do not limit myself to the particular size, shape, number, arrangement or material of parts as shown and described as these are given solely for the purpose of clearly describing my invention.

What I claim is:

In combination, an upstanding waste-water exit pipe and a lower pipe, said lower pipe having an upstanding leg and a second leg which is inclined to said upstanding leg and which leads to a trap, the bottom end-portion of said upstanding pipe being located within the top end-portion of said upstanding leg, said top end-portion of said upstanding leg having an external thread, a coupling which is located partially above said upstanding leg of said lower pipe, said coupling being external to said pipes, the bottom end-portion of said coupling having an internal thread, the inner wall of said coupling being spaced laterally from the external wall of said upstanding pipe directly above the top edge of said upstanding leg, a yieldable packing member whose bottom edge abuts the top edge of said upstanding leg, the inner wall of said packing member abutting the respective adjacent part of the outer wall of said upstanding pipe, said coupling having a shoulder which abuts the top edge of said packing member, said packing member being held in compressed state by said coupling and said top edge of said upstanding pipe and said respective adjacent part of said outer wall, to seal the joint between said pipes and to frictionally grip the outer wall of said upstanding pipe, said coupling having clamping means located above said shoulder and clamping said coupling to said upstanding pipe above said shoulder and above the top edge of said packing member, the lower pipe being downwardly slidable relative to said upstanding pipe in unison with said coupling under the pressure of the water in said upstanding pipe when the frictional grip of said packing member against said outer wall is sufficiently weakened, said clamping means having sufficient clamping force to maintain said coupling in position independently of said frictional grip.

JAMES CASTELLANO.